(12) United States Patent
Suda (10) Patent No.: US 10,702,816 B2
(45) Date of Patent: Jul. 7, 2020

(54) DEMISTER FOR CAPTURING MOIST FINE PARTICULATES

(71) Applicant: M-I L.L.C., Houston, TX (US)

(72) Inventor: Christina E. Suda, Independence, KY (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 14/773,565

(22) PCT Filed: Mar. 7, 2014

(86) PCT No.: PCT/US2014/021944
§ 371 (c)(1),
(2) Date: Sep. 8, 2015

(87) PCT Pub. No.: WO2014/138638
PCT Pub. Date: Sep. 12, 2014

(65) Prior Publication Data
US 2016/0175749 A1 Jun. 23, 2016

Related U.S. Application Data

(60) Provisional application No. 61/774,103, filed on Mar. 7, 2013.

(51) Int. Cl.
*B01D 45/12* (2006.01)
*B01D 45/08* (2006.01)
(Continued)

(52) U.S. Cl.
CPC ............. *B01D 45/08* (2013.01); *B01D 45/04* (2013.01); *B01D 45/12* (2013.01); *E21B 21/067* (2013.01); *E21B 43/40* (2013.01)

(58) Field of Classification Search
CPC ........ B01D 45/08; B01D 45/12; B01D 45/04; E21B 43/40; E21B 21/067
See application file for complete search history.

(56) References Cited

U.S. PATENT DOCUMENTS 2,838,131 A * 6/1958 Peterson ................ B01D 45/08
55/319
3,186,551 A * 6/1965 Dornauf ............... B01D 17/045
210/243
(Continued)

FOREIGN PATENT DOCUMENTS

JP 05-212232 A 8/1993
JP 10-085541 A 4/1998
(Continued)

OTHER PUBLICATIONS

International Search Report and Written Opinion for the equivalent International patent application PCT/US2014/021944 dated Jun. 25, 2014.
(Continued)

*Primary Examiner* — Dung H Bui (57) ABSTRACT

An apparatus is disclosed including an encasement defining a gas inlet to receive a gas stream and a gas outlet to release the gas stream. The apparatus further includes a vertical baffle attached to an encasement top within the encasement, the vertical baffle in contact with at least one horizontal baffle, the baffles separating the encasement into at least one chamber. The gas stream passes through the at least one chamber through perforations on the at least one horizontal baffle, and particulates from the gas stream are deposited on the encasement or the baffles.

10 Claims, 4 Drawing Sheets

(51) Int. Cl.
  *B01D 45/04* (2006.01)
  *E21B 21/06* (2006.01)
  *E21B 43/40* (2006.01)

(56) References Cited

U.S. PATENT DOCUMENTS

| | | | | |
|---|---|---|---|---|
| 3,201,919 | A * | 8/1965 | Long | B01D 19/0036 55/459.1 |
| 3,454,129 | A * | 7/1969 | Everett | F01N 1/24 181/268 |
| 3,477,208 | A * | 11/1969 | Keller, Sr. | B01D 19/0042 137/395 |
| 3,957,465 | A * | 5/1976 | Pircon | B01D 45/08 261/116 |
| 4,297,116 | A * | 10/1981 | Cusick | B01D 46/002 55/319 |
| 4,341,540 | A * | 7/1982 | Howerin | A47L 7/0014 15/353 |
| 4,387,603 | A * | 6/1983 | Nelson | B01D 45/08 73/863.22 |
| 4,440,639 | A * | 4/1984 | Galuska | B01D 21/0009 210/120 |
| 4,488,887 | A * | 12/1984 | Angel | B01D 8/00 55/308 |
| 4,635,735 | A * | 1/1987 | Crownover | E21B 21/067 175/42 |
| 4,818,257 | A * | 4/1989 | Kennedy | B01D 39/2017 422/161 |
| 5,310,282 | A * | 5/1994 | Voskamp | B09B 1/008 405/128.25 |
| 5,591,243 | A * | 1/1997 | Colussi | B01D 45/08 55/321 |
| 5,713,985 | A | 2/1998 | Hamilton | |
| 6,080,228 | A * | 6/2000 | Okada | B01D 46/0012 55/396 |
| 6,892,854 | B2 * | 5/2005 | Wagner | F01N 1/003 181/249 |
| 9,039,799 | B2 * | 5/2015 | Schook | B01D 45/06 55/287 |
| 2001/0004879 | A1 * | 6/2001 | Umotoy | B01D 8/00 118/715 |
| 2001/0027168 | A1 * | 10/2001 | Adams | B01F 5/0683 507/117 |
| 2004/0031622 | A1 * | 2/2004 | Butler | E21B 21/001 175/5 |
| 2005/0279715 | A1 * | 12/2005 | Strong | B01D 17/0211 210/774 |
| 2007/0251384 | A1 * | 11/2007 | Kurukchi | B01D 1/0017 95/253 |
| 2009/0217634 | A1 * | 9/2009 | Choi | B01D 45/08 55/426 |
| 2011/0114389 | A1 * | 5/2011 | Mathena | E21B 21/067 175/66 |
| 2012/0181028 | A1 * | 7/2012 | Daussin | C02F 9/00 166/305.1 |
| 2013/0000266 | A1 | 1/2013 | Asbury | |
| 2013/0104507 | A1 * | 5/2013 | Lu | B01D 45/08 55/436 |
| 2013/0192841 | A1 * | 8/2013 | Feasey | E21B 21/08 166/336 |
| 2014/0014214 | A1 * | 1/2014 | Eia | E21B 21/06 137/899.2 |
| 2014/0260993 | A1 * | 9/2014 | Elms | B01D 19/0063 175/206 |
| 2014/0371113 | A1 * | 12/2014 | Fout | E21B 21/066 507/117 |
| 2015/0343355 | A1 * | 12/2015 | Lucas | B01D 45/08 55/443 |

FOREIGN PATENT DOCUMENTS

| | | | | |
|---|---|---|---|---|
| KR | 1020120139922 A | | 12/2012 | |
| WO | WO-2013049802 A2 * | | 4/2013 | E21B 21/066 |

OTHER PUBLICATIONS

International Preliminary Report on Patentability for the equivalent International patent application PCT/US2014/021944 dated Sep. 17, 2015.

* cited by examiner

DEMISTER FOR CAPTURING MOIST FINE PARTICULATES

BACKGROUND

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

While drilling, the drilling fluid tends to entrain and accumulate various gases from the earth formation. Examples of such gases can include hydrogen sulfide, oxygen, carbon dioxide, nitrogen, and methane. An over accumulation of such gases can result in decreasing the density of the drilling fluid thereby impeding its ability to maintain the desired hydrostatic overbalance in the well to prevent a blowout. Accordingly, various degasification methods have been developed to remove these gases from the drilling fluid before it is recycled to the well for further use. Such degasification methods result in the generation of moving gas streams for transporting the removed gas for further processing or disposal. These moving gas streams comprise of moist fine particulates which come from the degasification process of the drilling fluid. During the movement of theses gas streams, the moist fine particulates deposit onto process equipment, such as moving blower parts, causing the equipment to malfunction or cease operating.

There exists a need for improved methods and apparatus for the removal of moist fine particulates in moving gas streams.

DETAILED DESCRIPTION

Figure 1:
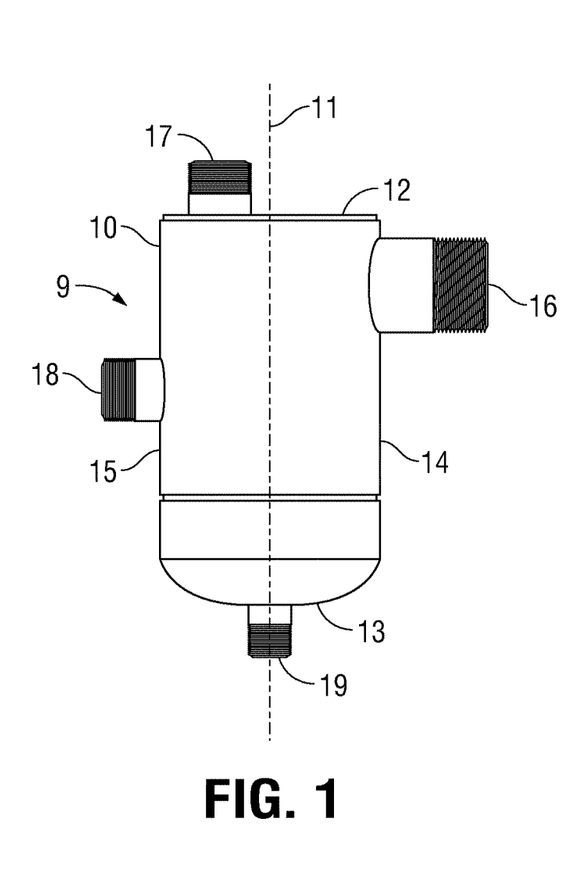
FIG. 1 depicts an anterior view of a demister for the removal of fine particulates from a gas stream in accordance with embodiments of the present disclosure.

FIG. 1 generally provides an anterior view of the demister 9 according to embodiments of the present disclosure. The demister 9 may comprise an encasement 10 which is generally cylindrical about a central vertical axis 11. The demister may further comprise an encasement top 12, an encasement bottom 13, encasement right side 14, and encasement left side 15. A sagittal plane (not depicted) is any plane which intersects the demister 9 and is parallel to a plane bisecting the encasement 10 into a right half and a left half. A transverse plane (not depicted) is any plane which intersects the demister 9 and is parallel to a plane bisecting the encasement 10 into a top and bottom half. A coronal plane (not depicted) is any plane which intersects the demister 9 and is parallel to a plane bisecting the encasement 10 into an anterior half and a posterior half.

FIG. 1 further depicts an encasement 10 in fluid communication with a gas inlet 16, a gas outlet 17, an atmospheric inlet 18, and a cleaning outlet 19. During operation of the demister 9, fluid communication of the encasement 10 with the cleaning outlet 19 may be blocked by a sealing member (not shown) such as a ball valve or seal, for example. A device, such as a blower (not shown), in fluid communication with the gas outlet may apply a negative pressure to the encasement 10. This negative pressure may cause an untreated gas stream comprising entrained moist fine particulates to be drawn into the encasement 10 through the gas inlet 16. While the untreated gas stream flows through the encasement 10, entrained moist fine particulates within the gas stream may become captured therein resulting in a treated gas stream released from the gas outlet 17.

During operation of the demister 9, the atmospheric inlet 18 may be in fluid communication with atmospheric air (i.e., receive incoming air) thereby providing for the regulation and maintenance of: desirable pressure inside the encasement 10, desirable pressure of the gas exiting though the gas outlet 17, desirable gas flow entering though the gas inlet 16, desirable gas flow in the encasement 10, and/or desirable gas flow exiting through the gas outlet 17. Receiving air through the atmospheric inlet 18 may regulate and/or reduce the negative pressure (i.e., suction) through the gas inlet 16. The amount of suction at the gas inlet 16 may be determined by a total flow rate of air out of the gas outlet 17 and the size of the opening of the atmospheric inlet 18. For example, in an embodiment, the size of the atmospheric inlet 18 may be 1.5 inches in diameter. In such embodiment, if a reducer (not shown) is coupled to the atmospheric inlet 18 to reduce its diameter to a smaller size, the rate of air flow into the gas inlet 16 would increase.

Although FIG. 1 only shows one gas inlet 16, other examples of the demister 9 may include additional gas inlets which fluidly communicate with the encasement 10 to allow a gas stream to be drawn into the encasement in substantially the same manner as the depicted gas inlet 16 consistent with the present disclosure. Although FIG. 1 only shows one gas outlet 17, other examples of the demister 9 may include additional gas outlets which fluidly communicate with the encasement and allow for negative pressure to be applied to the encasement 10 in substantially the same manner as the depicted gas outlet 17 consistent with the present disclosure. Although FIG. 1 only shows one atmospheric inlet 18, other examples of the demister 9 may include additional atmospheric inlets which fluidly communicate with the encasement 10 and operate in substantially the same manner as the depicted atmospheric inlet 18 consistent with the present disclosure. And although FIG. 1 only shows one cleaning outlet 19, other examples of the demister 9 may include additional cleaning outlets which fluidly communicate with the encasement and operate in substantially the same manner as the depicted cleaning outlet 19 consistent with the present disclosure.

Examples of pressures inside the encasement 10 during operation of the demister 9 range from about 3 inches of water (747 pascal) to about 9 inches of water (2241 pascal). Examples of pressures of the gas exiting the gas outlet 17 during operation of the demister 9 range from about 3 inches of water (747 pascal) to about 9 inches of water (2241 pascal). Examples of gas flow exiting through the gas outlet 17 during operation of the demister 9 ranges from about 95 to about 100 cubic feet per minute. Examples of gas flow entering through both the gas inlet 16 and atmospheric inlet 18 range from about 95 to about 100 cubic feet per minute. The volumetric flow rate through either of these inlets can vary depending on factors such as internal pressure, atmospheric pressure, and size of the inlet pipes at 16 and 18. Examples of gas flow in the encasement 10 during operation of the demister 9 range from about 95 to about 100 cubic feet per minute. Examples of gas flow exiting through the gas outlet 17 during operation of the demister 9 ranges from about 95 to about 100 cubic feet per minute. In an embodiment of the present disclosure, the encasement 10 may be in fluid communication with one gas inlet 16, one gas outlet 17, and one cleaning outlet 19 which is blocked during operation.

Still referring to FIG. 1, in an embodiment of the demister 9, the gas inlet 16 is cylindrical about a central gas inlet axis (not shown) and is attached to and fluidly communicates with the encasement left side 15 and is distal to the encasement right side 14. In another embodiment, the gas inlet axis lies on a transverse plane in the top quarter portion of the encasement 10. In yet another embodiment, the gas inlet axis is located on a transverse plane in the top eighth portion of the encasement 10. In a more specific embodiment, the gas inlet axis lies within a coronal plane that is no more than about 3 centimeters away from the coronal plane that bisects the encasement 10.

Further referring to FIG. 1, in an embodiment of the demister 9, the gas outlet 17 is cylindrical about a central gas outlet axis (not depicted) and may be attached to and in fluid communication with the encasement top 12. The gas outlet axis may be proximate to the encasement right side 14 and distal from the encasement left side 15. In a specific embodiment, the gas outlet axis lies in a coronal plane that is no more than about 3 centimeters away from the coronal plane that bisects the encasement 10.

Still referring to FIG. 1, in an embodiment of the demister 9, the atmospheric inlet 18 may be cylindrical about a central atmospheric inlet axis (not depicted) may be attached to and in fluid communication with the encasement left side 15. The atmospheric inlet axis is distal to both the encasement top 12 and encasement bottom 13 and is proximal to the transverse plane which bisects the encasement 10.

Referring once more to FIG. 1, in one example of the demister 9, the cleaning outlet 19 is cylindrical about a central cleaning outlet axis (not depicted) and may be attached to and in fluid communication with the encasement bottom 13. The cleaning outlet axis is parallel and proximal to the encasement axis 11. In a specific example, the cleaning outlet axis is no more than 3 centimeters away from the encasement axis.

In an embodiment, the demister 9 may include an encasement defining a gas inlet 16 to receive a gas stream and a gas outlet 17 to release the gas stream. A vertical baffle 26 attached to an encasement top 12 within the encasement 10, the vertical baffle 26 in contact with at least one horizontal baffle 24, 25, the baffles separating the encasement into at least one chamber. The stream passes through the at least one chamber through perforations on the at least one horizontal baffle 24, 25, and particulates from the gas stream are deposited on the encasement 10 or the baffles 24-26.

Figure 2:
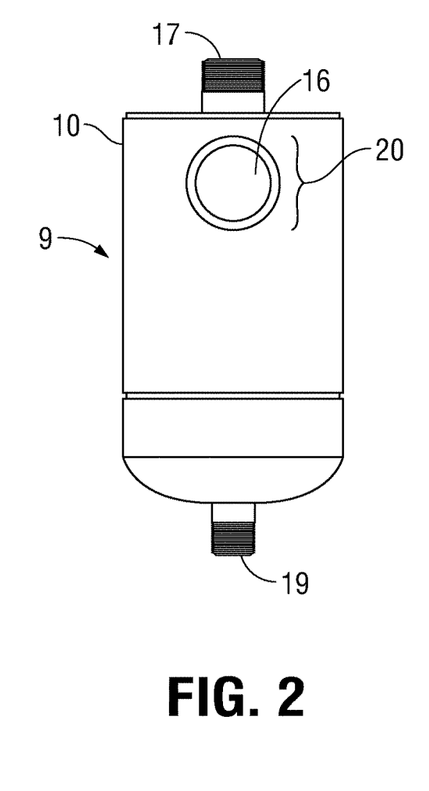
FIG. 2 depicts a left view of the demister of FIG. 1.

For exemplification, attention is drawn to FIG. 2 which depicts an alternative view of the demister 9 as viewed orthogonal to a sagittal plane. FIG. 2 depicts the encasement 10 in fluid communication with the gas inlet 16, the gas outlet 17, and the cleaning outlet 19. Although the encasement is also fluidly connected thereto, the atmospheric inlet is hidden from view of FIG. 2 because the atmospheric inlet is located on the opposite side of the gas inlet 16. In an embodiment of the demister 9, the gas inlet 16 fluidly communicates with an untreated gas stream source. As shown, the gas inlet has a gas inlet diameter 20, the size of which can be chosen to maintain the desired pressures and gas flows which have been set forth above. For example, the gas inlet diameter can be chosen depending upon the size and the power of a vacuum device. In specific embodiments of the demister 9, the gas inlet diameter ranges from 1 to 3 inches.

Figure 3:
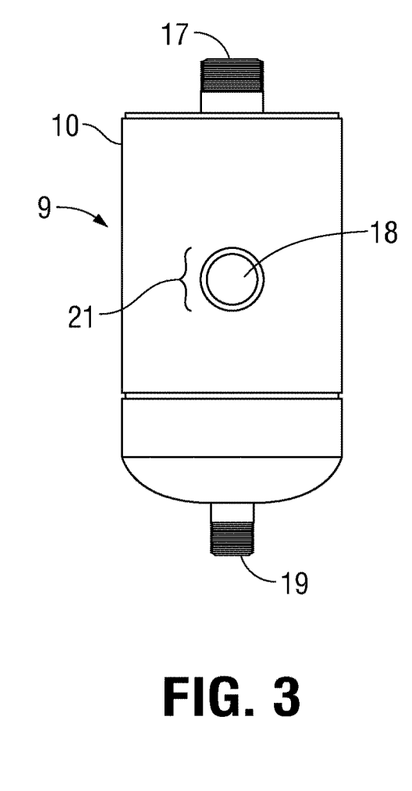
FIG. 3 depicts a right view of the demister of FIG. 1.

As a further example, attention is drawn to FIG. 3 which depicts a right view of the demister 9 as viewed orthogonal to a sagittal plane. FIG. 3 depicts the encasement 10 in fluid communication with the gas outlet 17, the atmospheric inlet 18, and the cleaning outlet 19. Although the encasement 10 is also fluidly connected thereto, as shown in FIG. 3, the gas inlet is hidden from view since it is located on the opposite side of the atmospheric inlet 18. The atmospheric inlet 18 has an atmospheric inlet diameter 21 as such to maintain the desired pressures and gas flows which have been set forth above. If the chosen atmospheric inlet diameter 21 is too large, the air flow and pressure in the encasement 10 during operation could be reduced to unacceptable levels or to a level preventing operability. If the chosen atmospheric inlet diameter 21 is too small during operation, the air flow and vacuum pressure in the encasement 10 could be increased to unacceptable levels such that the untreated gas stream flows through the encasement 10 too rapidly thereby preventing desirable amounts of moist entrained particles to be removed from the untreated gas stream. In addition, having the inlet diameter 21 be too small in size may cause liquid mud to be drawn into the demister resulting in clogging and eventually the stopping of air flow through the casing. In specific embodiments of the demister 9, the atmospheric inlet diameter 21 ranges from about 1 to 3 inches.

Figure 4:
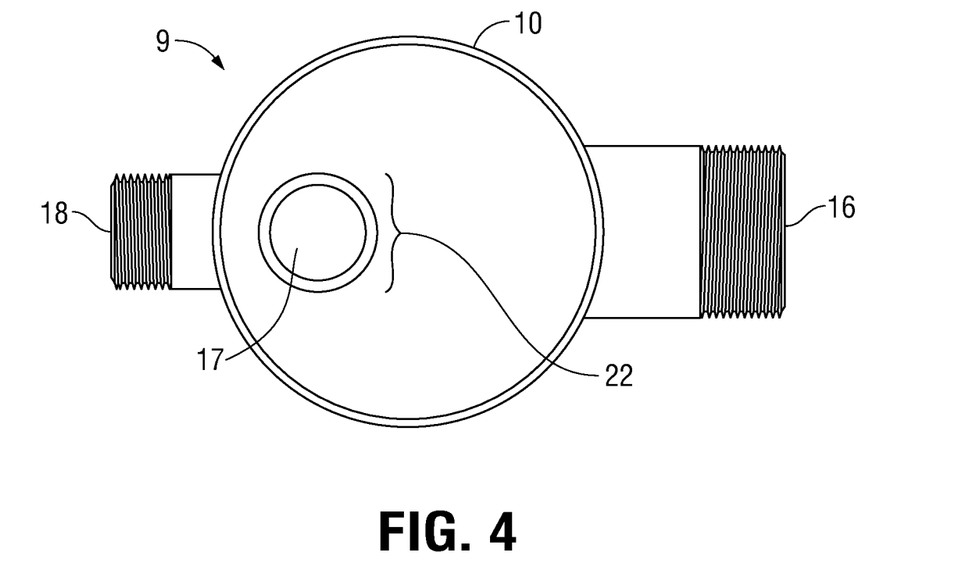
FIG. 4 depicts of a top view of the demister of FIG. 1.

Turning now to FIG. 4, a top view is provided as viewed orthogonal to a coronal plane. FIG. 4 depicts the encasement 10 in fluid communication with the gas inlet 16, the gas outlet 17, and the atmospheric inlet 18. Although the encasement 10 is also fluidly connected thereto, the cleaning outlet 19, located at the bottom of encasement 10, is hidden from the present view. In an embodiment of the demister 9, the gas outlet 17 is in fluid communication with a vacuum device, such as a blower, which can provide negative pressure to the encasement 10. As shown in FIG. 4, the gas outlet 17 has a gas outlet diameter 22, the size of which can be chosen to maintain the desired pressures and gas flows which have been set forth above. For example, the gas outlet diameter can be chosen depending upon the size and the power of coupled vacuum device. In specific embodiments of the demister 9, the gas outlet diameter ranges from about 1 to 3 inches.

Figure 5:
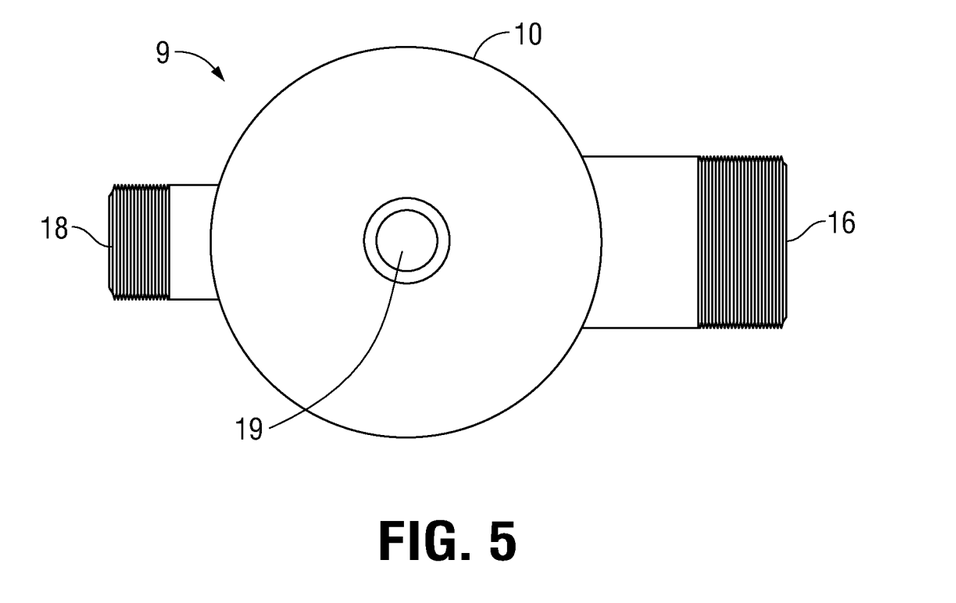
FIG. 5 depicts a bottom view of the demister of FIG. 1.
Figure 6:
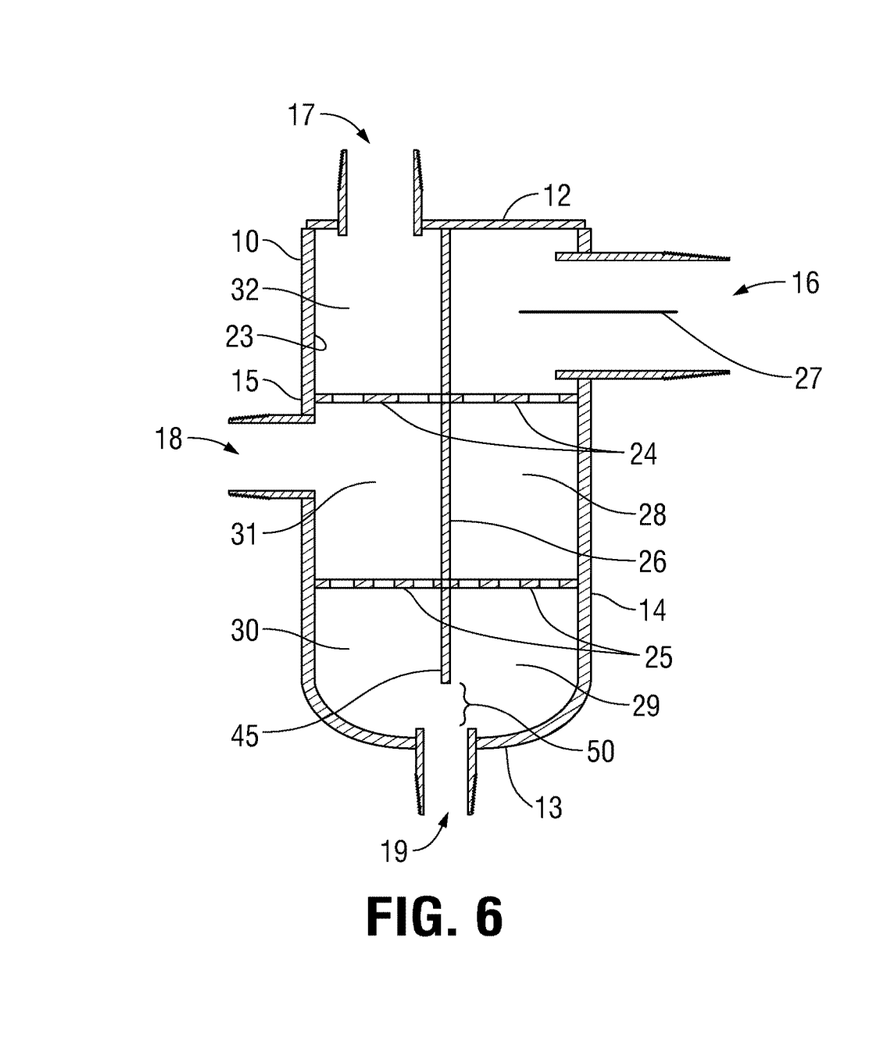
FIG. 6 depicts a cross sectional view of the demister of FIG. 1.
Figure 7:
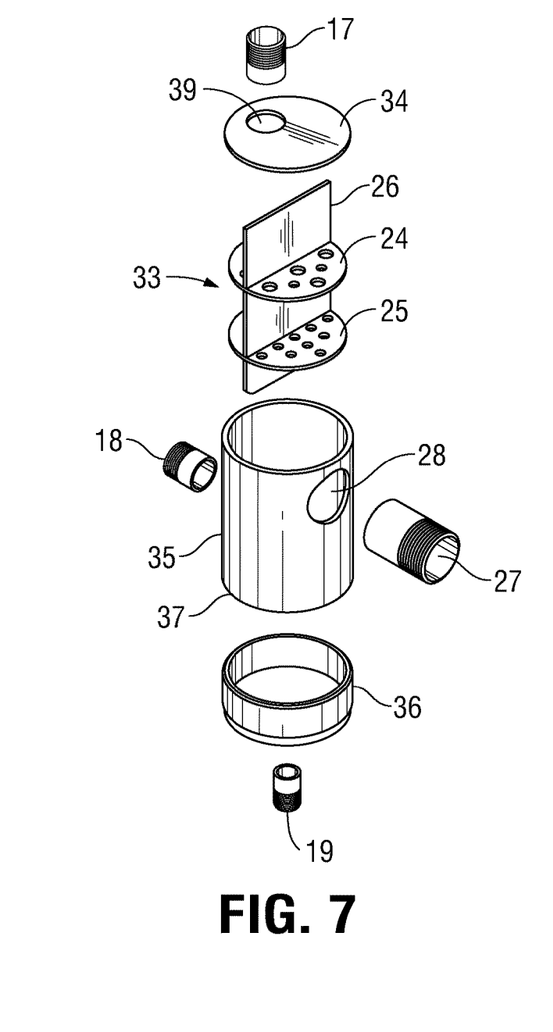
FIG. 7 is an exploded view of the demister of FIG. 1.
Figure 8:
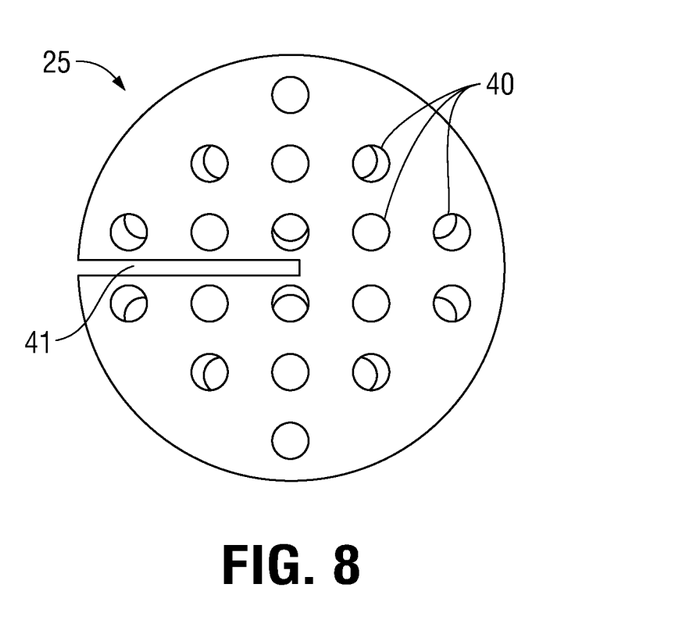
FIG. 8 depicts an upper baffle disposed within the demister of FIG. 1.

Turning now to FIG. 5, a bottom view is provided as viewed orthogonal to a coronal plane. FIG. 5 depicts the encasement 10 in fluid communication with the gas inlet 16, the atmospheric inlet 18, and the cleaning outlet 19. Although the encasement 10 is also fluidly communicated thereto, the gas outlet, located at the top of the encasement 10, is hidden from present view. During operation of the demister 9, fluid communication of the encasement 10 with the cleaning outlet 19 may be blocked by a sealing member (not shown) such as a ball valve or seal, for example. A negative pressure may be applied to the gas outlet (hidden from view) thereby causing an untreated gas stream comprising entrained moist fine particulates to enter the encasement 10 through the gas inlet 16. While flowing through the inside of the encasement 10, entrained moist fine particulates from the untreated gas stream may become captured inside the encasement 10 resulting in a treated gas stream which leaves the encasement 10 through the gas outlet (hidden from view). If after operation, it is desired to clean the inside of the encasement 10 by removing the captured particles within, the fluid communication between the encasement 10 and cleaning outlet 19 can be unblocked. Cleaning fluid, such as water, can be introduced into the encasement 10 via the cleaning outlet 19 and allowed to drain out of one of the following: the gas inlet 16, the atmospheric inlet 18, or the gas outlet (hidden from view). Alternatively, the cleaning outlet 19 can instead be used as a drain and the cleaning fluid can be introduced into the encasement 10 through one of the following: the gas inlet 16, the atmospheric inlet 18, or the gas outlet (hidden from view).

The demister is further exemplified in FIG. 6 which depicts a cross-sectional view of encasement 10. The encasement 10, including an encasement inside wall 23, is in fluid communication with a gas inlet 16, a gas outlet 17, an atmospheric inlet 18, and a cleaning outlet 19. During operation of the demister 9, fluid communication of the encasement 10 with the cleaning outlet 19 may be blocked by a sealing member (not shown) such as a ball valve or seal, for example. Also depicted in FIG. 6 is a generally circular shaped upper baffle 24 extending along a transverse plane terminating at a radial edge that abuts against the encasement inside wall 23. The upper baffle 24 is proximal to the encasement top 12. Below the upper baffle 24 is a generally circular shaped lower baffle 25 extending along a transverse plane terminating at a radial edge that abuts against the encasement inside wall 23. The upper baffle 24 and lower baffle 25 are arranged such that they divide the encasement into three sections of roughly equal volume. Both the upper baffle 24 and lower baffle 25 have perforations (e.g., holes) allowing fluid communication there through. The upper baffle 24 and lower baffle 25 are attached to a rectangular shaped vertical baffle 26 extending along a sagittal plane terminating at an upper edge, right edge, left edge, and lower edge; wherein the upper edge abuts against the encasement top 12, the right edge abuts against the right side encasement 14, the left edge abuts against the left side encasement 15, and the vertical baffle lower edge 45 terminates within the encasement 10 in between the lower baffle 25 and the encasement bottom 13. The area between the lower edge of the vertical baffle and the encasement bottom 13 defines a bottom cavity 50 allowing fluid communication between the left and right side of the encasement. The encasement bottom 13 may be shaped to deflect the moving gas stream in a transverse direction away from the inferior left chamber 30, toward the encasement right side, into the inferior right chamber 29. The encasement bottom 13 may be further shaped to deflect the moving gas stream in an upward direction, towards the encasement top 12, along the encasement right side, and out the gas outlet 17. The vertical baffle 26 has a continuous surface (e.g., no perforations) preventing fluid communication there through. In a specific embodiment, the vertical baffle roughly bisects the encasement 10 dividing it into a left and right half.

In an embodiment, the upper baffle 24, lower baffle 25, and vertical baffle 26 may be arranged so that they divide the encasement 10 into six chambers of roughly the same volume: a superior right chamber 27, a medial right chamber 28, an inferior right chamber 29, the inferior left chamber 30, the medial left chamber 31, and the superior left chamber 32. During operation, the gas outlet 17 fluidly communicates with a vacuum device (not shown) providing a negative pressure to the inside of the encasement 10 thereby causing an untreated gas stream comprising entrained moist fine particulates to enter the superior right chamber 27. The treated gas stream passes though the superior right chamber 27 and enters the medial right chamber 28 via perforations (not shown) in the upper baffle 24. The untreated gas stream passes though the medial right chamber 28 and enters the inferior right chamber 29 via perforations (not shown) in the lower baffle 25. The untreated gas stream passes through the inferior right chamber 29 and enters the inferior left chamber 30 via the bottom cavity 50. The untreated gas stream passes through the inferior left chamber 30 and enters the medial left chamber 31 via perforations (not shown) in the lower baffle 25. The untreated gas stream passes though the medial left chamber 31 and enters the superior left chamber 32 via perforations (not shown) in the upper baffle 24. The untreated gas stream may pass through the superior left chamber 32 and leave via the gas outlet 17 resulting in a treated gas stream. As the untreated gas successively moves though each of the aforementioned six chambers, entrained moist fine particulates are removed from the untreated gas stream and are deposited on the surfaces of at least one of: the encasement 10, the upper baffle 24, the lower baffle 25, and the vertical baffle 26.

FIG. 7 depicts a demister in accordance with embodiments of the present disclosure, shown in a partially exploded state. FIG. 7 shows a baffle assembly 33 comprising the upper baffle 24 and the lower baffle 25 both attached to a vertical baffle 26. Also shown are the gas outlet 17 which may fit into an opening 39 of a generally circular encasement lid 34 which is used to seal the top end of an encasement body 35 that is generally cylindrical about the encasement axis (not shown). A bottom cap 36 may be used to seal the bottom end of encasement body 35. The bottom cap 36 may have an opening into which the cleaning outlet 19 may fit. In a specific embodiment, the encasement body 35 may further comprise threads (not shown) proximate to its bottom end 37; and the bottom cap may have internal threads (not shown) having a corresponding pitch to the threads on the encasement body 35 so that the bottom cap 36 may engage with the bottom end 37 of the encasement body 35. The encasement body may have an opening 28 into which the gas inlet 27 may fit. The encasement body may have an opening (not shown) on the right side into which the atmospheric inlet 18 may fit. An example of assembling the demister is by fitting and welding one component to another. This may be done successively along with screwing the bottom cap 36 to the encasement body 35 until the demister is assembled.

In an embodiment, the baffle assembly 33 comprising the vertical baffle 26, lower baffle 25 and upper baffle 24, may divide the encasement into six chambers: a superior left chamber 32, a medial left chamber 31, the inferior left chamber 30, the inferior right chamber 29, a medial right chamber 28, and a superior right chamber.

FIG. 8 depicts a lower baffle 25 which, when in an assembled state, may be inserted in the interior of the demister (not shown). The lower baffle 25 defines a plurality of perforations 40 which, in aggregate, define a lower baffle voided area through which fluid communication across the lower baffle 25 is permitted. The lower baffle voided area may be defined as the sum of all the perforation voided areas of the lower baffle 25. In an embodiment of the demister, the lower baffle 25 comprises perforations, each having a generally circular shape. In another example, the lower baffle 25 comprises perforations all having substantially equal perforation voided areas. Also shown in FIG. 8 is a notch 41 into which the vertical baffle may fit or be engaged.

Figure 9:
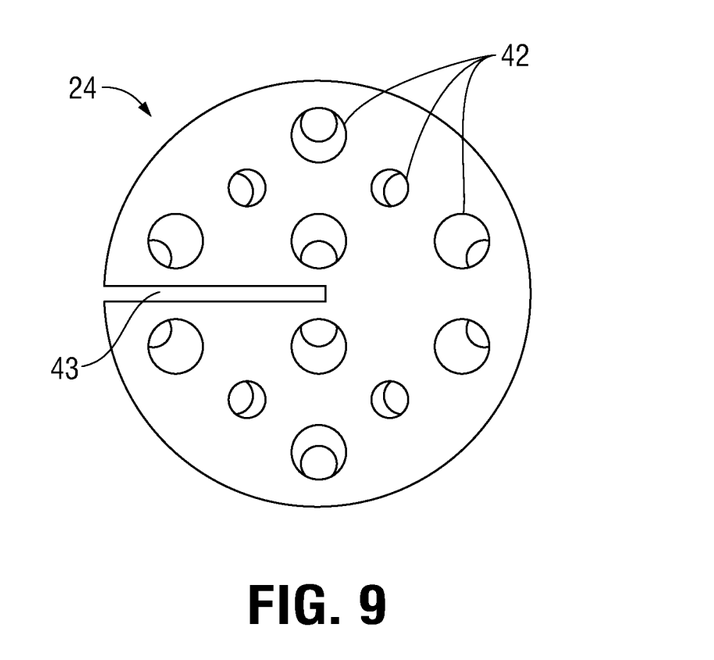
FIG. 9 depicts a lower baffle disposed within the demister of FIG. 1.

FIG. 9 depicts an upper baffle 24 which, when in an assembled state, may be inserted in the interior of the demister (not shown). The upper baffle 24 comprises a plurality of perforations 42 which, in aggregate, define an upper baffle voided area through which fluid communication across the upper baffle 24 is permitted. The upper baffle voided area is defined as the sum of all the perforation voided areas of the lower baffle 25. In a particular embodiment, the upper baffle voided area is greater than the lower baffle voided area. In another embodiment, the lower baffle voided area is about 15-25 percent less than the upper baffle voided area. In yet another embodiment, the upper baffle 24 comprises perforations having a generally circular shape. In still another embodiment, the upper baffle 24 comprises perforations having different perforation voided areas. Also shown in FIG. 8 is a notch 43 in to which the vertical baffle may engage.

In an embodiment of this disclosure the demister may be incorporated in wellbore drilling operations. In particular, this disclosure includes the use of the demister in a process to remove gas which has been entrained in a drilling fluid during use of the fluid in a wellbore. In general, degassers are used to remove entrained gasses from a used drilling fluid before recycling it back to the wellbore. This prevents the undesirable accumulation of entrained gas in drilling fluid used in the wellbore. The over accumulation of entrained gas may reduce the density of the drilling fluid rendering it less able or unable to maintain adequate hydrostatic pressure in the wellbore. Without adequate hydrostatic pressure the wellbore can become unstable and a blowout can occur.

A useful degasser for removal of entrained gas from drill fluid is a degasser which may comprise a centrifuge which applies centrifugal force to the drilling fluid. The centrifugal force of the degasser may act on the drilling fluid causing the entrained gas to become more buoyant and to migrate in the form of bubbles to the surface of the drilling fluid where they are released. A vacuum device, in fluid communication with the degasser, may remove this released gas in the form of a gas stream. During its formation by the vacuum device, the gas stream becomes entrained with fine particulates from the drilling fluid. If these entrained moist fine particulates are not removed from the gas stream, they can deposited on the surface of the vacuum device where they undesirability accumulate and cause fouling and equipment failure. An embodiment of the present disclosure addresses this undesirable accumulation by placing a demister in fluid communication between the degasser and the vacuum device so that at least some of the fine particulates become captured in the demister.

Compositions in accordance with embodiments of the present invention are also advantageous in that the constituent chemicals have no or reduced toxicity. Thus, the described fluid compositions may be viable alternatives to more toxic chemicals used for the specific applications, allowing users to retain performance while reducing the overall environmental impact.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed:

1. A method of removing gas from drilling fluid, the method comprising:
    providing a used drilling fluid having gas entrained therein;
    removing the gas from the used drilling fluid, wherein the removed gas is in a form of a gas stream;
    providing an encasement comprising a gas inlet, an atmospheric inlet, and a vertical baffle in contact with at least one horizontal baffle that extends on both sides of the vertical baffle, wherein the vertical baffle and the at least one horizontal baffle separate the encasement into a plurality of chambers and the vertical baffle has a continuous surface with no perforations preventing fluid communication therethrough;
    passing the gas stream into the encasement through the gas inlet, deflecting the gas stream downward from the gas inlet, and passing the gas stream through the plurality of chambers of the encasement and through perforations on the at least one horizontal baffle;
    receiving incoming air from the atmospheric inlet; and
    depositing particulates from the gas stream on at least one of the encasement, the vertical baffle, and the at least one horizontal baffle.

2. The method of claim 1, further comprising:
    applying centrifugal force to the used drilling fluid such that the entrained gas migrates to a surface of the used drilling fluid.

3. The method of claim 2, further comprising
    coupling a vacuum device to a gas outlet of the encasement for removing the gas from the used drilling fluid.

4. The method of claim 1, wherein the vertical baffle separates the encasement into an encasement first side and an encasement second side, the vertical baffle being disposed to deflect the gas stream downward toward an encasement bottom.

5. The method of claim 4, wherein the encasement bottom is shaped to deflect the gas stream from the encasement first side to the encasement second side.

6. The method of claim 4, wherein the vertical baffle terminates at a vertical baffle first edge located within the encasement and at a point in between the at least one horizontal baffle and the encasement bottom.

7. The method of claim 1, further comprising:
    recycling the used drilling fluid after the entrained gas is removed therefrom.

8. A method of removing gas from drilling fluid, the method comprising:
    providing a used drilling fluid having gas entrained therein;
    removing the gas from the used drilling fluid, wherein the removed gas is in a form of a gas stream;
    providing an encasement comprising a gas inlet, an atmospheric inlet, and a vertical baffle in contact with a first horizontal baffle and a second horizontal baffle that extend on both sides of the vertical baffle, wherein the vertical baffle, the first horizontal baffle, and the second horizontal baffle separate the encasement into a plurality of chambers, the first horizontal baffle has first perforations defining a first baffle voided area, the second horizontal baffle has second perforations defining a second baffle voided area, and the second baffle voided area is greater than the first baffle voided area;
    passing the gas stream into the encasement through the gas inlet, deflecting the gas stream downward from the gas inlet, and passing the gas stream through the plurality of chambers of the encasement and through perforations on the at least one horizontal baffle;

receiving incoming air from the atmospheric inlet; and depositing particulates from the gas stream on at least one of the encasement, the vertical baffle, the first horizontal baffle, and the second horizontal baffle.

9. The method of claim 8, wherein the first baffle voided area is about 15-25 percent less than the second baffle voided area.

10. A method of removing gas from drilling fluid, the method comprising:

providing a used drilling fluid having gas entrained therein;

removing the gas from the used drilling fluid, wherein the removed gas is in a form of a gas stream;

providing an encasement comprising a gas inlet, an atmospheric inlet, and a vertical baffle in contact with a first horizontal baffle and a second horizontal baffle that extend on both sides of the vertical baffle, wherein the vertical baffle, the first horizontal baffle, and the second horizontal baffle separate the encasement into a plurality of chambers, the first horizontal baffle has first perforations having substantially equal perforation voided areas, and the second horizontal baffle has second perforations having different perforation voided areas;

passing the gas stream into the encasement through the gas inlet, deflecting the gas stream downward from the gas inlet, and passing the gas stream through the plurality of chambers of the encasement and through perforations on the at least one horizontal baffle;

receiving incoming air from the atmospheric inlet; and depositing particulates from the gas stream on at least one of the encasement, the vertical baffle, the first horizontal baffle, and the second horizontal baffle.

* * * * *